United States Patent
Kanada et al.

(10) Patent No.: US 6,820,578 B2
(45) Date of Patent: Nov. 23, 2004

(54) VALVE TIMING CONTROL DEVICE

(75) Inventors: Yoji Kanada, Gamagori (JP); Takeshi Hashizume, Aichi-ken (JP); Osamu Komazawa, Chita (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/670,477

(22) Filed: Sep. 26, 2003

(65) Prior Publication Data

US 2004/0112314 A1 Jun. 17, 2004

(30) Foreign Application Priority Data

Sep. 26, 2002 (JP) ........................................ 2002-281495

(51) Int. Cl.[7] ................................................ F01L 1/34
(52) U.S. Cl. ................................ 123/90.15; 123/90.16; 123/90.17; 123/90.31
(58) Field of Search .......................... 123/90.15, 90.16, 123/90.17, 90.18, 90.27, 90.31; 464/1, 2, 160

(56) References Cited

U.S. PATENT DOCUMENTS

| | | | | |
|---|---|---|---|---|
| 5,924,395 A | * | 7/1999 | Moriya et al. | 123/90.15 |
| 6,378,475 B2 | * | 4/2002 | Takenaka et al. | 123/90.17 |
| 6,439,184 B1 | * | 8/2002 | Takenaka et al. | 123/90.17 |
| 6,684,835 B2 | * | 2/2004 | Komazawa et al. | 123/90.17 |

FOREIGN PATENT DOCUMENTS

| | | |
|---|---|---|
| JP | 2001-50063 A | 2/2001 |
| JP | 2001-355468 A | 12/2001 |

* cited by examiner

Primary Examiner—Thomas Denion
Assistant Examiner—Ching Chang
(74) Attorney, Agent, or Firm—Burns, Doane, Swecker & Mathis, L.L.P.

(57) ABSTRACT

A variable valve timing control device includes a drive member rotatable in synchronization with a crankshaft, a rotatable driven member connected to a camshaft arranged co-axially with the drive member, a hydraulic chamber formed at one of the drive member and the driven member, a vane dividing the hydraulic chamber into an advanced angle chamber and a retarded angle chamber, a relative rotation phase controlling mechanism which controls a relative rotation phase between the drive member and the driven member between a most retarded angle phase in which a volume of the advanced angle chamber is a maximum and a most advanced angle phase in which a volume of the retarded angle chamber is a maximum by supplying or discharging operation fluid to and/or from the advanced angle chamber and the retarded angle chamber, a lock mechanism which restricts relative rotation between the drive member and the driven member, when the relative rotation phase is a predetermined lock phase between the most advanced angle phase and the most retarded angle phase, a control mechanism performing an intermediate phase operation upon input of a signal indicating engine stop to position the relative rotation phase intermediate between the most advanced angle phase and the most retarded angle phase by operating the relative rotation phase controlling mechanism, and performing a drain operation to drain the operation fluid from both the advanced angle chamber and the retarded angle chamber after performing the intermediate phase operation.

6 Claims, 12 Drawing Sheets

VALVE TIMING CONTROL DEVICE

CROSS REFERENCE TO RELATED APPLICATIONS

The present application is based on and claims under 35 U. S. C. § 119 with respect to Japanese Patent Application No. 2002-281495 filed on Sep. 26, 2002, the entire contents of which are incorporated herein by reference.

FIELD OF THE INVENTION

The present invention is generally directed to valve timing control device. More particularly, the present invention pertains to a valve timing control device for controlling an opening and closing time of at least one of an intake valve and an exhaust valve of a internal combustion engine on the basis of the running condition of a vehicle-mounted internal combustion engine.

BACKGROUND OF THE INVENTION

In general, the variable valve timing control device comprising: a drive member rotatable in synchronization with a crankshaft, a rotatable driven member connected to a camshaft arranged co-axially with the drive member, a hydraulic chamber formed at one of the drive member and the driven member, a vane dividing the hydraulic chamber into an advanced angle chamber and a retarded angle chamber, a relative rotation phase controlling mechanism which controls a relative rotation phase between the drive member and the driven member between a most retarded angle phase in which a volume of the advanced angle chamber is a maximum and a most advanced angle phase in which a volume of the retarded angle chamber is a maximum by supplying or discharging operation fluid to and/or from the advanced angle chamber and the retarded angle chamber.

Further, the variable valve timing control device comprising: a lock mechanism which restricts relative rotation between the drive member and the driven member, when the relative rotation phase is a predetermined lock phase between the most advanced angle phase and the most retarded angle phase at the engine start in order to prevent the vane from oscillating in the fluid pressure chamber by periodical fluctuation torque of a cam causing by the camshaft opening and closing the valve and obtain the smooth startability of the engine and the adjusting width extending to both advanced angle direction and the retarded angle direction of the relative rotation phase of the both rotation member Aforesaid lock mechanism biases a lock body provided on the rotatable drive member to the rotatable driven member side by a spring and insert the aforesaid lock body into the lock oil chamber provided on the rotatable driven member and restrain the aforesaid relative rotation and obtain lock status. On the other hand aforesaid lock mechanism draw back the lock body to the rotatable drive member side by supplying lock oil in the lock oil chamber and providing oil pressure and unlock the aforesaid lock status A known valve timing control device of the general kind is disclosed in Japanese-Laid-Open 2001-50063, and it detects the relative rotation phase between the rotatable drive member and the rotatable driven member at the engine stop upon input of a signal indicating engine stop from the ignition key switch and feedback-controls the aforesaid relative rotation phase control mechanism and adjust the relative rotation phase of both rotation members to lock phase side and restrains the aforesaid relative rotation and obtain lock status by the aforesaid lock mechanism.

By the way, although the aforesaid control mechanism of the aforesaid valve timing control device needs to drain lock oil from the lock oil chamber and obtain the aforesaid lock status during the relatively short time from input of a signal indicating engine stop from the ignition key switch to rotation stop of the crankshaft. The aforesaid control mechanism of the aforesaid valve timing control device occasionally can not obtain the aforesaid lock status when the engine oil is yet low temperature and of high viscosity while the engine is not warm.

Therefore, A known valve timing control device of the general kind is disclosed in Japanese-Laid-Open 2001-355468, and it passes the relative rotation phase of both rotation member through the lock phase and obtains the lock status by the lock mechanism by making the advanced angle chamber, the retarded angle chamber and the lock oil chamber at drain status when the crankshaft is compulsorily rotated by the starter upon input of a signal indicating engine stop from the ignition key switch (hereinafter called cranking) and oscillating the aforesaid vane in the fluid pressure chamber by the fluctuation torque of the cam in order to obtain the aforesaid lock status at the engine start.

The causes of preventing the aforesaid lock status from being obtained are that the remaining operational oil in the advanced angle chamber or the retarded angle chamber prevents the relatively rotation, in other word, the oscillation in the fluid pressure chamber between the rotatable drive member and the rotatable driven member and that the remaining oil in the lock oil chamber prevents the lock body from inserting into the lock oil chamber.

Especially in case that the engine oil is low temperature as the engine not warm and the engine is restarted immediately after the engine stops, the operational oil in the advanced angle chamber or the retarded angle chamber and the lock oil in the lock oil camber occasionally can not be drained perfectly because the engine oil is yet low temperature and of high viscosity. In case that the lock oil is not drained perfectly from lock oil chamber the aforesaid lock oil prevent the relative rotation of both rotation member and the insert of the lock body and the lock status can not be obtained.

SUMMARY OF THE INVENTION

It is, therefore, an object of the present invention to provide an improved valve timing control device which overcomes the above drawbacks.

It is another object of the present invention to provide an improved valve timing control device which obtains exactly the lock status to restrain the relative rotation between the rotatable drive member and the rotatable driven member.

The invention provides a variable valve timing control device comprising: a drive member rotatable in synchronization with a crankshaft, a rotatable driven member connected to a camshaft arranged co-axially with the drive member, a hydraulic chamber formed at one of the drive member and the driven member, a vane dividing the hydraulic chamber into an advanced angle chamber and a retarded angle chamber, a relative rotation phase controlling mechanism which controls a relative rotation phase between the drive member and the driven member between a most retarded angle phase in which a volume of the advanced angle chamber is a maximum and a most advanced angle phase in which a volume of the retarded angle chamber is a maximum by supplying or discharging operation fluid to and/or from the advanced angle chamber and the retarded angle chamber, a lock mechanism which restricts relative rotation between the drive member and the driven member, when the relative rotation phase is a predetermined lock phase between the most advanced angle phase and the most retarded angle phase, a control mechanism performing an intermediate phase operation upon input of a signal indicating engine stop to position the relative rotation phase intermediate between the most advanced angle phase and the most retarded angle phase by operating the relative rotation phase controlling mechanism, and performing a drain operation to drain the operation fluid from both the advanced angle chamber and the retarded angle chamber after performing the intermediate phase operation.

BRIEF DESCRIPTION OF THE DRAWING FIGURES

DETAILED DESCRIPTION OF THE INVENTION

A valve timing control device in accordance with a preferred embodiment of the present invention will be described with reference to Figures.

Figure 1:
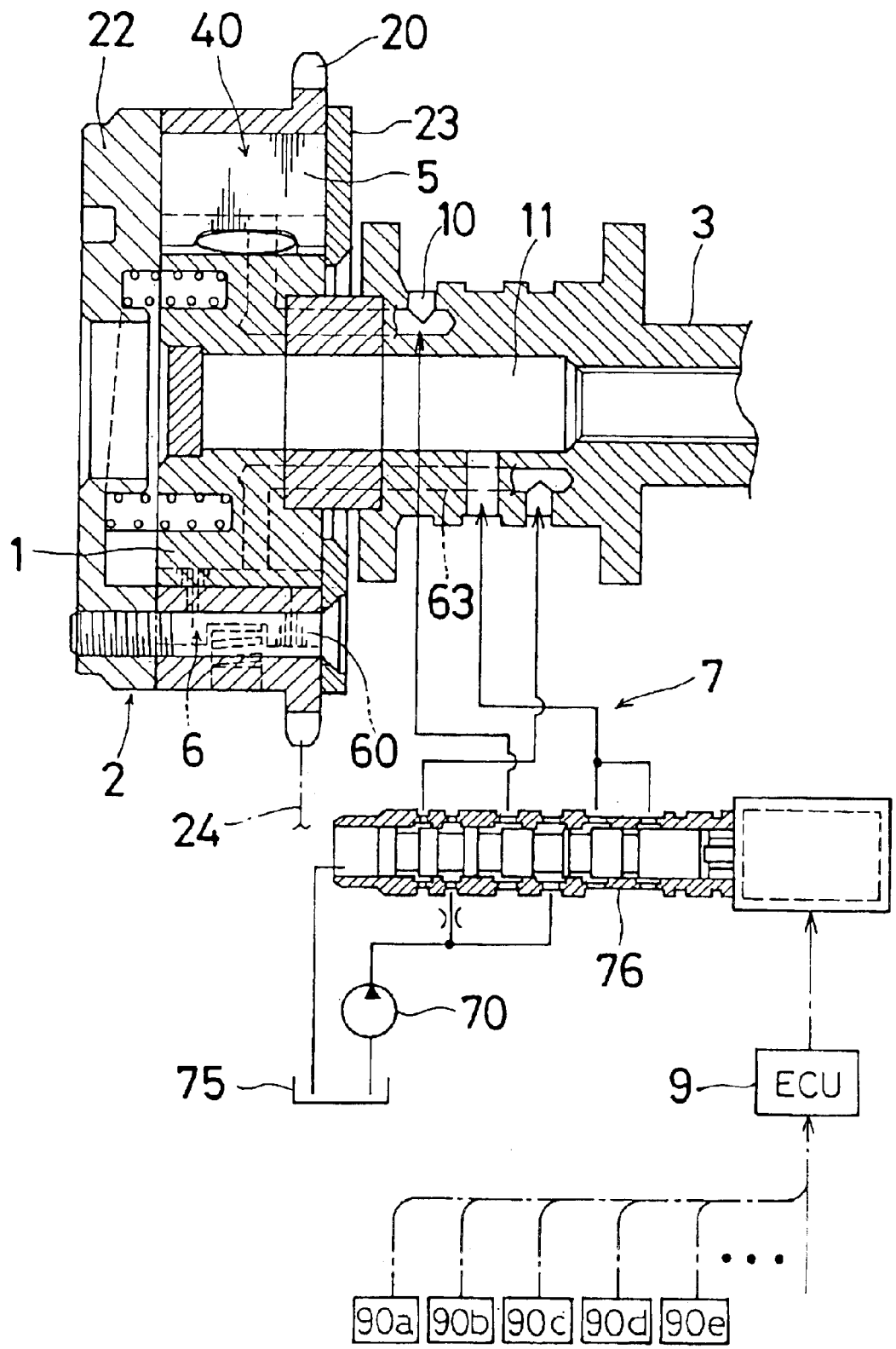
FIG. 1 is an axial cross-sectional view showing structure of the valve timing control device.

A valve timing control device referring to FIG. 1 is provided with an outer rotor 2 which is the drive-rotation member rotated simultaneusly with the crankshaft of the engine for automobile and an inner rotor 1 which is the driven-rotation member rotated simultaneusly with the camshaft 3.

The inner rotor 1 is assembled integrally on the projecting end of the cam shaft 3 rotatably integrally with the camshaft 3 mounted on a cylinder head of the engine.

The outer rotor 2 is mounted on the outer circumference of the inner rotor 1 so as to be able to rotate within a specified range relative to the inner rotor 1 and includes a front plate 22 and a rear plate 23 and a timing sprocket 20 which is mounted integrally on the outer circumference of the outer rotor 2.

The rotation transmitting member 24 which is a timing chain or a timing belt etc is installed between the timing sprocket 20 and a gear which is mounted on the crank shaft of the engine.

Figure 2:
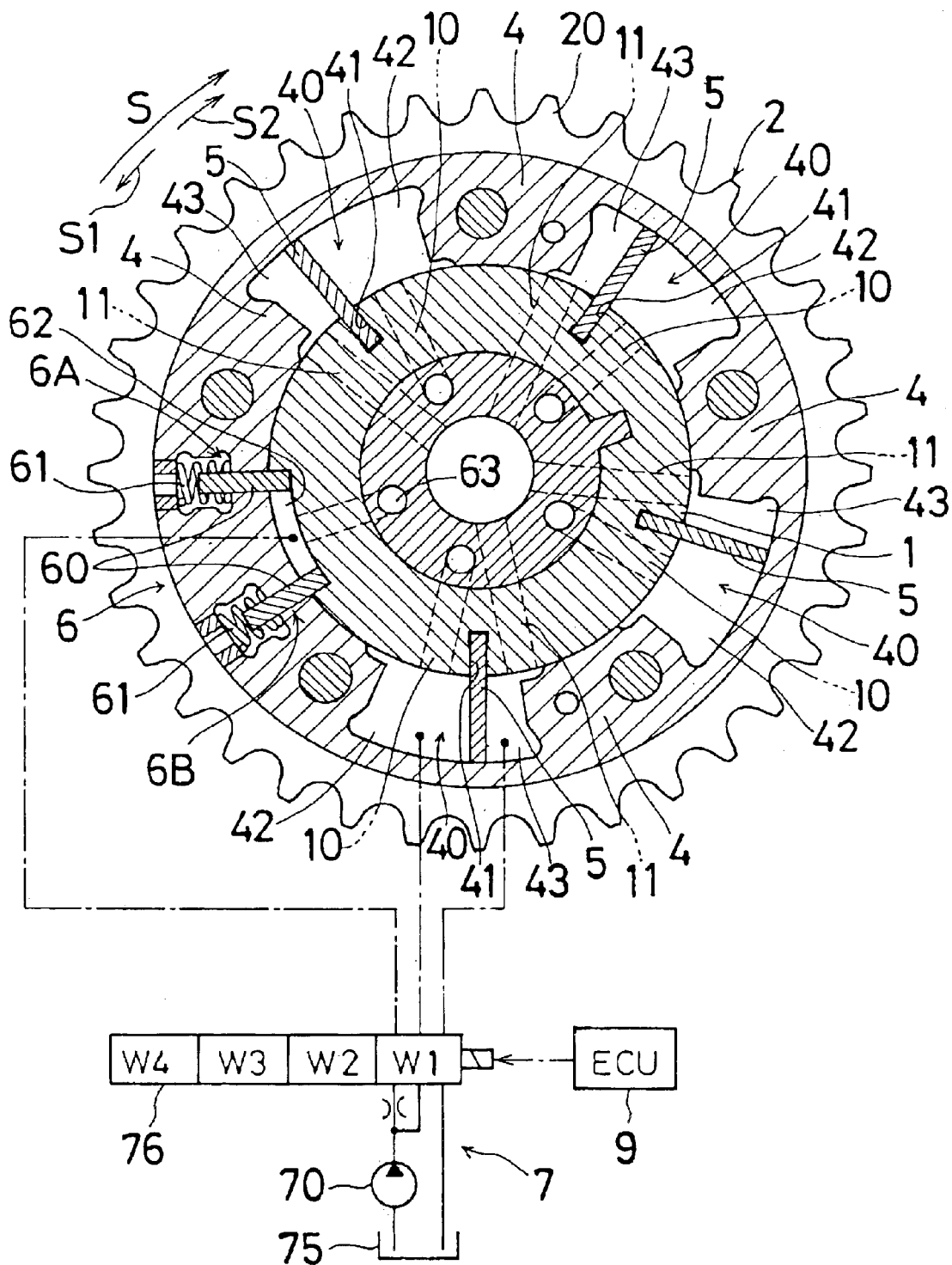
FIG. 2 is a cross-sectional view showing the lock status of the valve timing control device by the lock mechanism.

When the crank shaft begins to be rotated, the rotation torque is transmitted to the timing sprocket 20 via the rotation transmitting member 24. The outer rotor 2 provided with the timing sprocket 20 is rotated in the rotation direction S shown in FIG. 2. The inner rotor 1 is rotated in the rotation direction S and the camshaft 3 is rotated. The cams mounted on the camshaft 3 push down and open an intake valve or an exhaust valve.

The outer rotor 2 provided with several projections 4 acting as the shoe projecting in radial direction which are put side-by-side in rotational direction. A fluid pressure chamber 40 which is defined between the inner rotor 1 and the outer rotor 2 is formed between the abutting projections 4 on the outer rotor 2.

A vane groove 41 are formed on the outer periferal surface of the inner rotor 1 at the position which face to each of the fluid pressure chamber 40. A vane 5 which divides the fluid pressure chamber 40 into an advanced angle chamber 43 and a retarded angle chamber 42 in relative rotational direction (S1, S2 direction shown in FIG. 2) is inserted into the vane groove 41 in a manner to be slidable in radial direction.

The advanced angle chamber 43 is connected to an advanced angle passage 11 formed on the inner rotor 1. The retarded angle chamber 42 is connected to a retarded angle passage 10 formed on the inner rotor 1. The advanced angle passage 11 and the retarded angle passage 10 are connected to an after-mentioned hydraulic pressure circuit 7.

The hydraulic pressure circuit 7 functions as relative rotational phase control device which supplies and discharges engine oil as operation oil to/from one of or both the advanced angle chamber 43 or/and the retarded angle chamber 42 via the retarded angle passage 10 and the advanced angle passage 11. The hydraulic pressure circuit 7 changes the relative position of the vane 5 in the fluid pressure chamber 40 and control the relative rotational phase of the inner rotor 1 and the outer rotor 2(hereinafter called as the relative rotational phase of both rotors) between the most advanced angle phase(the relative rotational phase of both rotors is at which the volume of the advanced angle chamber 43 is maximum) and among the most retarded angle phase (the relative rotational phase of both rotors is at which the volume of the retarded angle chamber 42 is maximum).

For more detail, the hydraulic pressure circuit 7 comprises a pump 70 and a control valve 76 and an oil pan 76. The pump 70 is driven by driving force of the engine and supply the engine oil which is operational oil or after-mentioned lock oil to the control valve 76. The control valve 76 supplies and drains engine oil to/from several ports by changing the position of the spool with controlling a mount of the electricity of the ECU 9. The oil pan 75 stores engine oil. The aforesaid advanced angle passage 11 and retarded angle passage 10 are connected to specified port of the aforesaid control valve 76.

A lock mechanism 6 which locks the relative rotational phase of both rotors when the relative rotational phase of both rotors is the predetermined lock phase between the most advanced angle phase and the most retarded angle phase is provided between the inner rotor 1 and the outer rotor 2.

The lock mechanism 6 comprises a retarded lock portion 6A and an advanced lock portion 6B and a lock oil chamber 62 which is formed as concave at one of the portion on the periferal surface of the inner rotor 1.

The retarded lock portion 6A and the advanced lock portion 6B have the lock body 60 which is provided on the outer rotor 2 in a manner to be slidable in radial direction and a spring 61 which biases the lock body 60 in radial direction. The shape of the lock body 60 can be plate-shape or pin-shape or other shape.

The aforesaid retarded lock portion 6A prevents the relative rotation of the inner rotor 1 from rotating to the retarded angle direction from the lock phase relative to the outer rotor 2 when the lock body 60 is inserted into the lock oil chamber 62. The aforesaid advanced lock portion 6B prevents the relative rotation of the inner rotor 1 from rotating to the advanced angle direction from the lock phase when the lock body 60 is inserted into the lock oil chamber 62. So-called lock status that the relative rotational phase of both rotors can be locked at the predetermined lock phase set between the most advanced angle phase and the most retarded angle phase by inserting both lock body 60 of the retarded lock portion 6A and advanced lock portion 6B into the lock oil chamber 62 is obtained. The aforesaid lock phase is set at the phase where the opening and closing timing of the valve of the engine causes the smooth starting of the engine.

Figure 3:
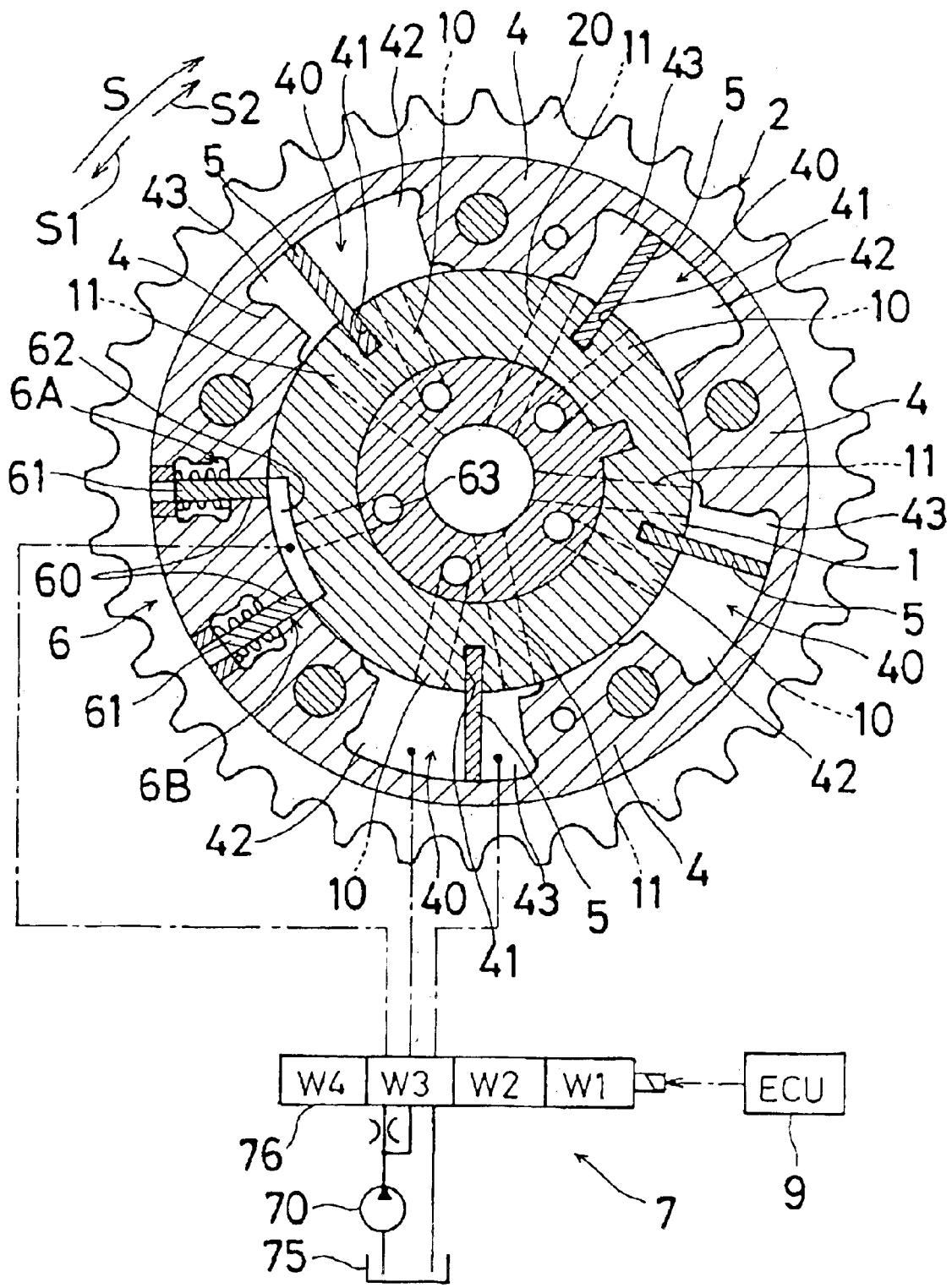
FIG. 3 is a cross-sectional view showing the unlock status of the valve timing control device by the lock mechanism.

The aforesaid lock oil chamber 62 is communicated to a lock oil passage 63 formed in the inner rotor 1. The lock oil passage 63 is connected to the specified port on the control valve 76 of the aforesaid oil pressure circuit 7. In other word, the hydraulic pressure circuit 7 supplies and discharges engine oil as lock oil via the lock oil passage 63 to and from the lock oil chamber 62. The lock body 60 slide back and unlock the lock condition of the relative rotational phase of both rotors as shown in FIG. 3 when the lock oil is supplied to the lock oil chamber 62 from the control valve 76.

Figure 4:
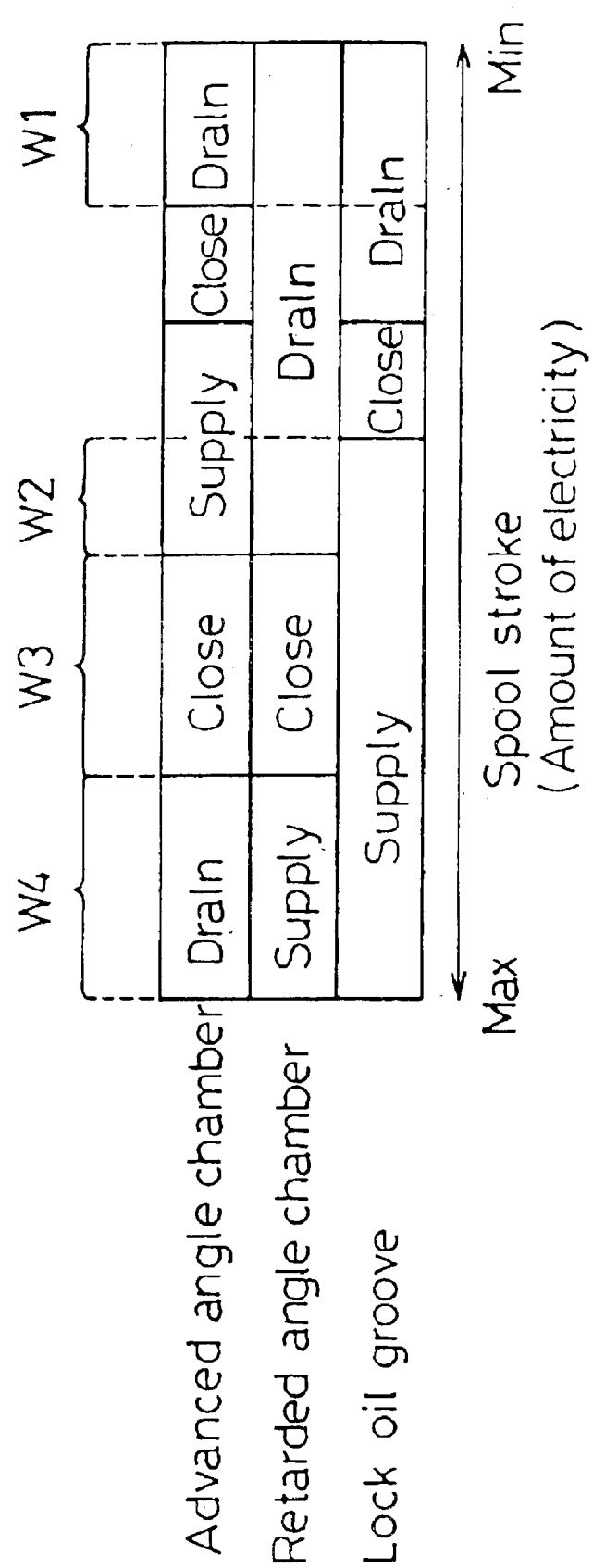
FIG. 4 is an operation chart showing the operation of the control valve.

As shown in FIG. 4 the control valve 76 of the oil pressure circuit 7 changes the position of the spool from a position W1 to a position W4 in proportion to the mount of the electricity from the ECU 9 and supplies and drains and stops the engine oil as lock oil to and from the advanced angle chamber 43 or/and the retarded angle chamber or/and the lock oil chamber 62.

In other word, when the spool position of the control valve 76 is set at the position W1, the drain operation to drain operation oil in both the advanced angle chamber 43 and retarded angle chamber 42 and lock oil in the lock oil chamber 62 to the oil pan 75 can be prosecuted.

When the spool position of the control valve 76 is set at the position W2, the advanced angle transfer operation to supply operation oil in the lock oil chamber 62 and unlock the lock condition of the relative rotational phase of both rotors 1,2 and drain operation oil from the retarded angle chamber 42 and supply operational oil to advanced angle chamber 43 and transfer the relative rotational phase of both rotors 1,2 into the advanced angle direction S2 can be prosecuted.

When the spool position of the control valve 76 is set at the position W3, the hold operation to unlock the lock condition of the relative rotational phase of both rotors 1,2 and stop supplying operation oil to the advanced angle chamber 43 and the retarded angle chamber 42 and hold the relative rotational phase of both rotors 1,2 at specified phase.

When the spool position of the control valve 76 is set at a position W4, the retarded angle transfer operation to unlock the lock status of the relative rotational phase of both rotors 1,2 and drain operation oil from the advanced angle chamber 43 and supply operation oil to the retarded angle chamber 42 and transfer the relative rotational phase of both rotors 1,2 to the retarded angle direction S1 can be prosecuted. By the way, the way of the transfer process of the control valve 76 is not defined as aforesaid way and it can be changed timely.

The ECU 9 provided for the engine incorporates a memory storing the specified program and CPU and input-output-interface and etc and acts as the control mechanism of the valve timing control device of this invention.

A detecting signal of a cam angle sensor 90a detecting the camshaft phase, a crank angle sensor 90b detecting the crankshaft phase, an oil temperature sensor 90c detecting the engine oil temperature, a rotation sensor 90d detecting the crankshaft rotation number(the engine rotation number), an ignition key switch (abbreviated to IG/SW), a vehicle speed sensor, a cooling water temperature sensor of engine, a throttle opening sensor and other sensors is inputted to the ECU 9. The ECU 9 can obtain the relative rotational phase of both rotors 1,2 of the valve timing control device from the camshaft phase detected by the cam angle sensor 90a and the crankshaft phase detected by the crank angle sensor 90b.

The ECU 9 regulates the mount of the electricity to the control valve 76 of the aforesaid oil circuit 7 ECU on the basis of the aforesaid engine oil temperature, the crankshaft rotation number, the vehicle speed, the throttle opening travel and the other engine performance parameter and controls the relative rotational phase of both rotors 1,2 at the phase which is suitable for the performance parameter.

Figure 5:
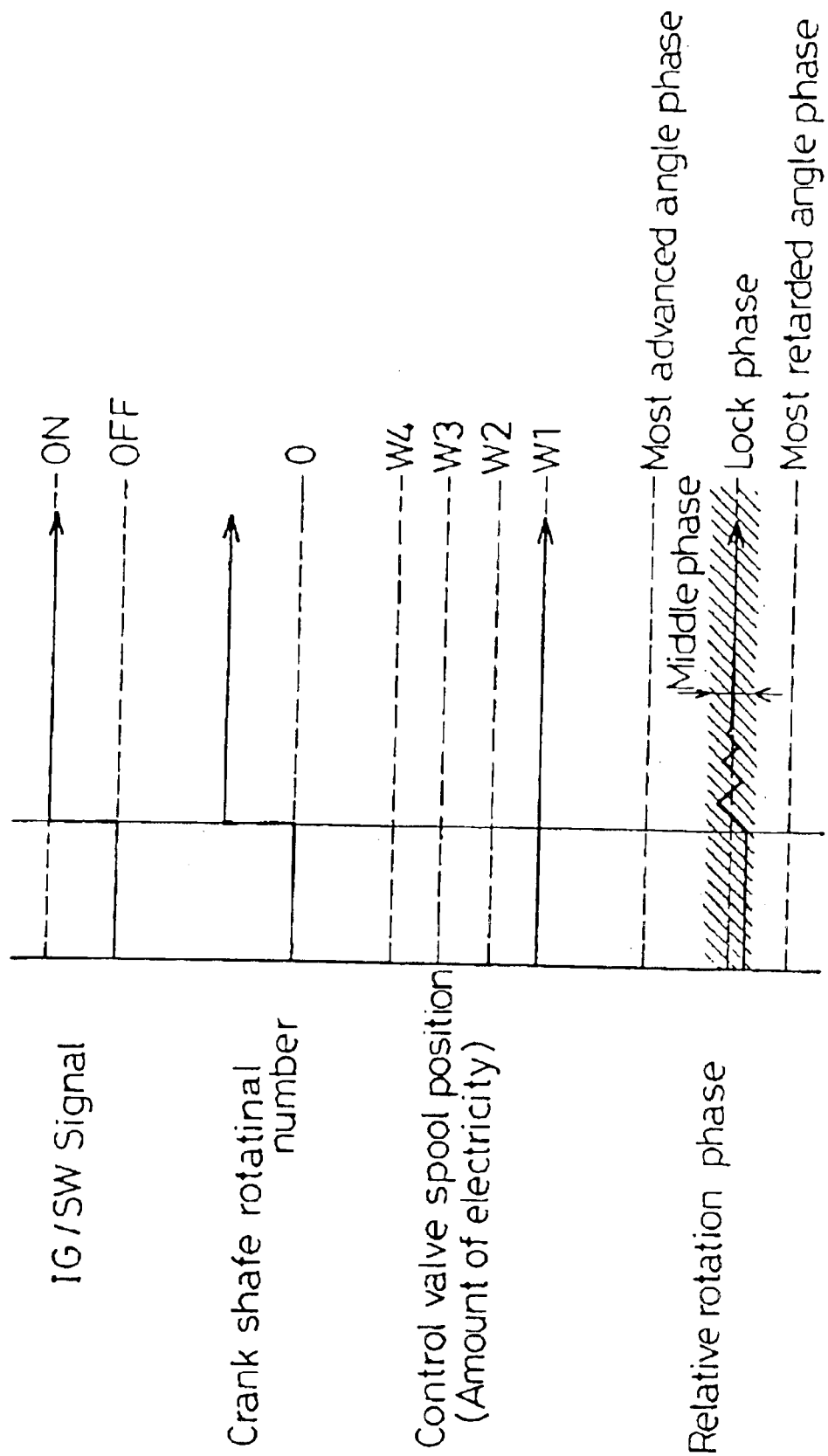
FIG. 5 is a timing chart showing some kinds of status at the engine start.

Next, the control status of the valve timing control device at the engine start is explained on the basis of the FIG. 5.

The ECU 9 as the control mechanism crank the crankshaft and start the engine after the engine start signal is inputted to the ECU 9 from the IG/SW 90e. The ECU 9 transfers the spool of the control valve 7 to the position W1 and drain operation oil in the advanced angle chamber 43, the retarded angle chamber 42 and the lock oil chamber 62 when the engine starts.

Further, the vane 5 reciprocates in the fluid pressure chamber 40 by the periodical cam fluctuation torque caused by the camshaft opening and closing the valve when the crankshaft is cranked at the condition while the operation oil in both the advanced angle chamber 43 and the retarded angle chamber 42 is drained. The relative rotational phase of both rotors 1,2 fluctuates periodically among the specified phase including the aforesaid lock phase. A pair of lock bodies 60 are biased by the spring 61 to the inner rotor 1 side when the engine starts.

In other word, the movement that the relative rotational phase of both rotors 1,2 fluctuates periodically among the specified phase including the aforesaid lock phase while a pair of lock bodies 60 are biased by the spring 61 to the inner rotor 1 side makes a pair of lock bodies 60 plunge into the lock oil chamber 62 at the moment when the relative rotational phase of both rotors 1,2 is the lock phase and makes the relative rotational phase of both rotors 1,2 be hold at lock phase fairly and be locked when the temperature of the lock oil is relatively high and the pressure of the lock oil in the lock oil chamber 62 is almost zero.

Therefore, if the aforesaid relative rotational phase of both rotors 1,2 is transferred to the lock phase immediately when the engine starts the good startability of the engine can be obtained Next, the control status of the valve timing control device at the engine stop is explained on the basis of the FIGS. 6 to 13.

Figure 6:
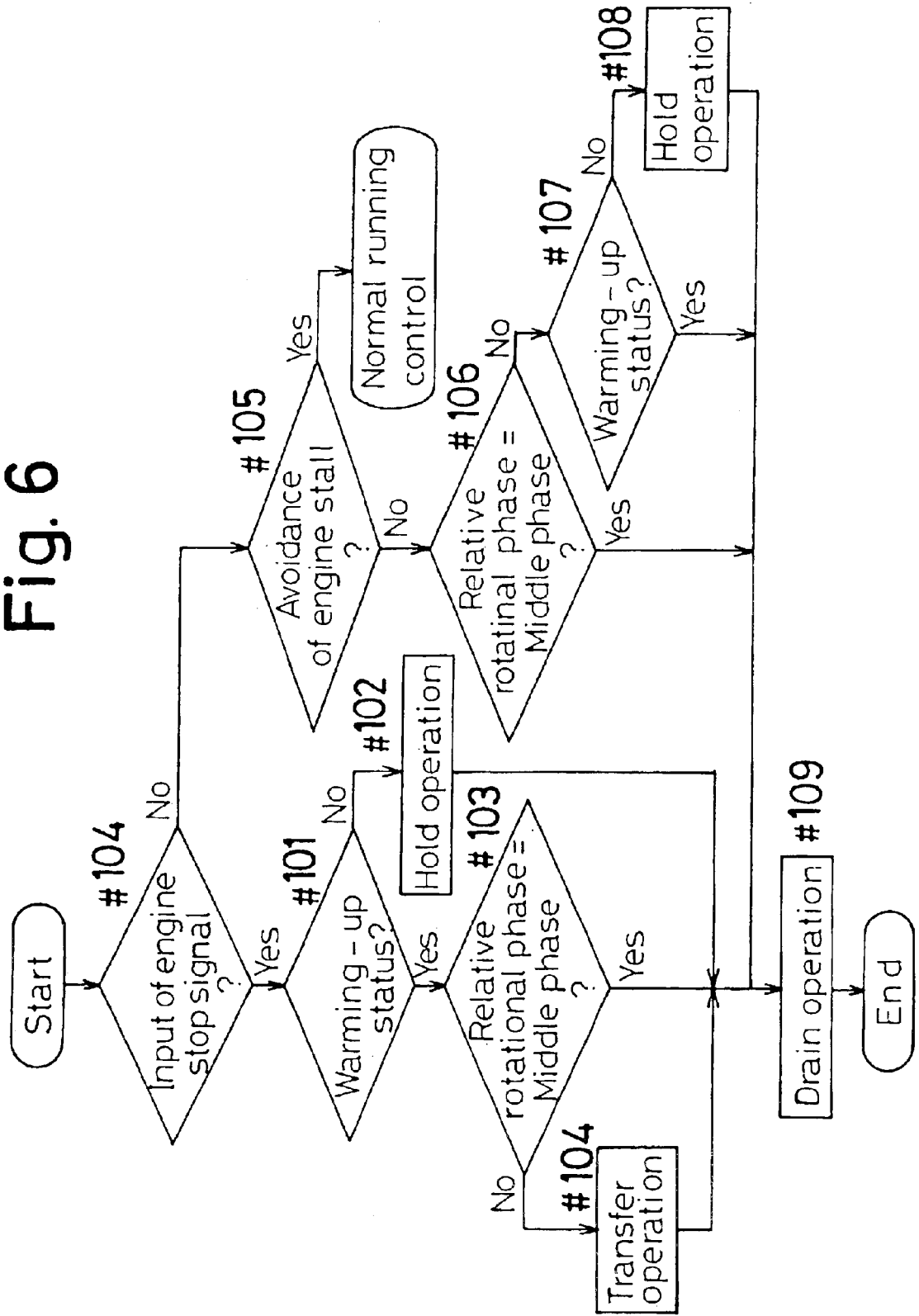
FIG. 6 is a flow chart showing the control status of the valve timing control device at the engine stop.

The ECU 9 as the control mechanism determines if the engine stop signal is inputted from the IG/SW 90e (step 100) as shown in FIG. 6. When the ECU 9 determines that the engine stop signal is inputted the after-mentioned normal stop processes of step 101 to 104 are prosecuted in accordance with the engine normal stop. When the ECU 9 determines that the engine stop signal is not inputted the after-mentioned abnormal stop processes of step 105 to 108 are prosecuted in accordance with the engine abnormal stop on the basis of the happening of the engine stall etc. After the prosecution of the aforesaid normal stop processes or abnormal stop processes the ECU 9 transfers the spool of the control valve 7 to the position W1 and prosecutes the drain operation to drain operation oil in both the advanced angle chamber 43, the retarded angle chamber 42 and the lock oil in the lock oil chamber 62 at the step 109.

Firstly the mode in which the drain operation is prosecuted at the aforesaid step 109 after the normal stop processes is explained. After the ECU 9 determines that the engine stop signal is inputted from the IG/SW 90e at the aforesaid step 100 the ECU 9 firstly prosecutes the step 101 and determines if the engine oil temperature detected by the oil temperature sensor 90c reaches to the predetermined warming-up temperature and whether the engine is at warming-up condition or not.

Next, when the ECU 9 determines that the engine is not at warming-up condition at the step 101 the ECU 9 prosecutes the step 102 and prosecutes the after-mentioned specified holding operation. When the ECU 9 determines that the engine is at warming-up condition at the step 101 the ECU 9 prosecutes the step 103.

When the ECU 9 determines that the engine is not at warming-up condition at the aforesaid step 101 it is considered that the relative rotational phase of both rotors 1,2 is hold at the lock phase by the lock mechanism 6 with the spool position of the control valve 76 set to the position W1 or that the relative rotational phase of both rotors 1,2 is hold near the lock phase which is at the middle phase between the aforesaid most advanced angle phase and the most retarded angle phase with the spool position of the control valve 76 set to the position W3.

Figure 7:
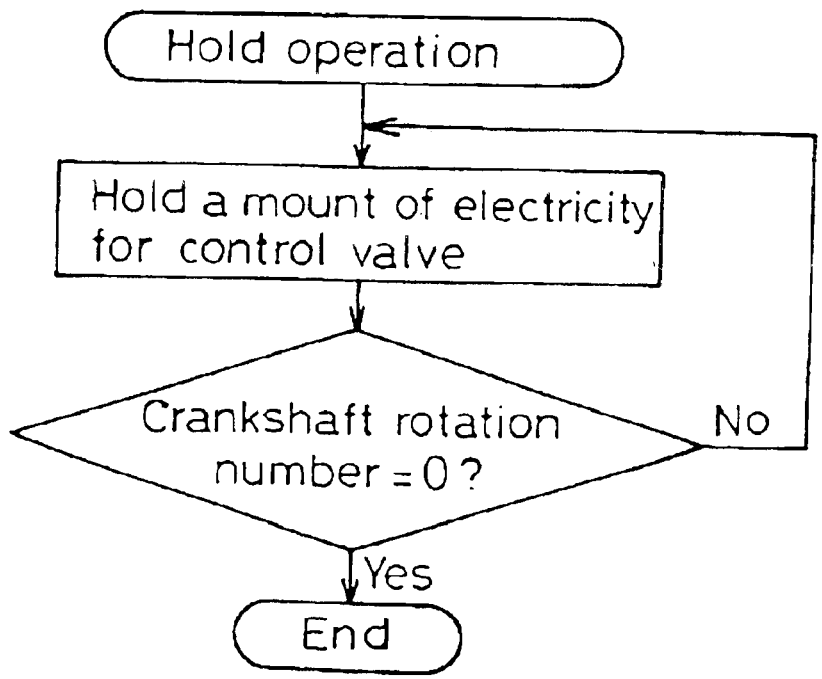
FIG. 7 is a flow chart showing the maintain operation of the valve timing control device shown in FIG. 6.

Therefore, when the ECU 9 determines that the engine is not at warming-up condition at the step 101 the ECU 9 maintains the mount of the electricity to the control valve 76 of the electricity at the engine stop signal input until the rotational number of the engine becomes zero as shown in FIG. 7. The ECU 9 prosecutes the hold operation to hold the relative rotational phase of both rotors 1,2 at the middle phase which is at the engine stop signal input. After the hold operation at the step 102 the ECU 9 prosecutes the drain operation of the aforesaid step 109.

Figure 9:
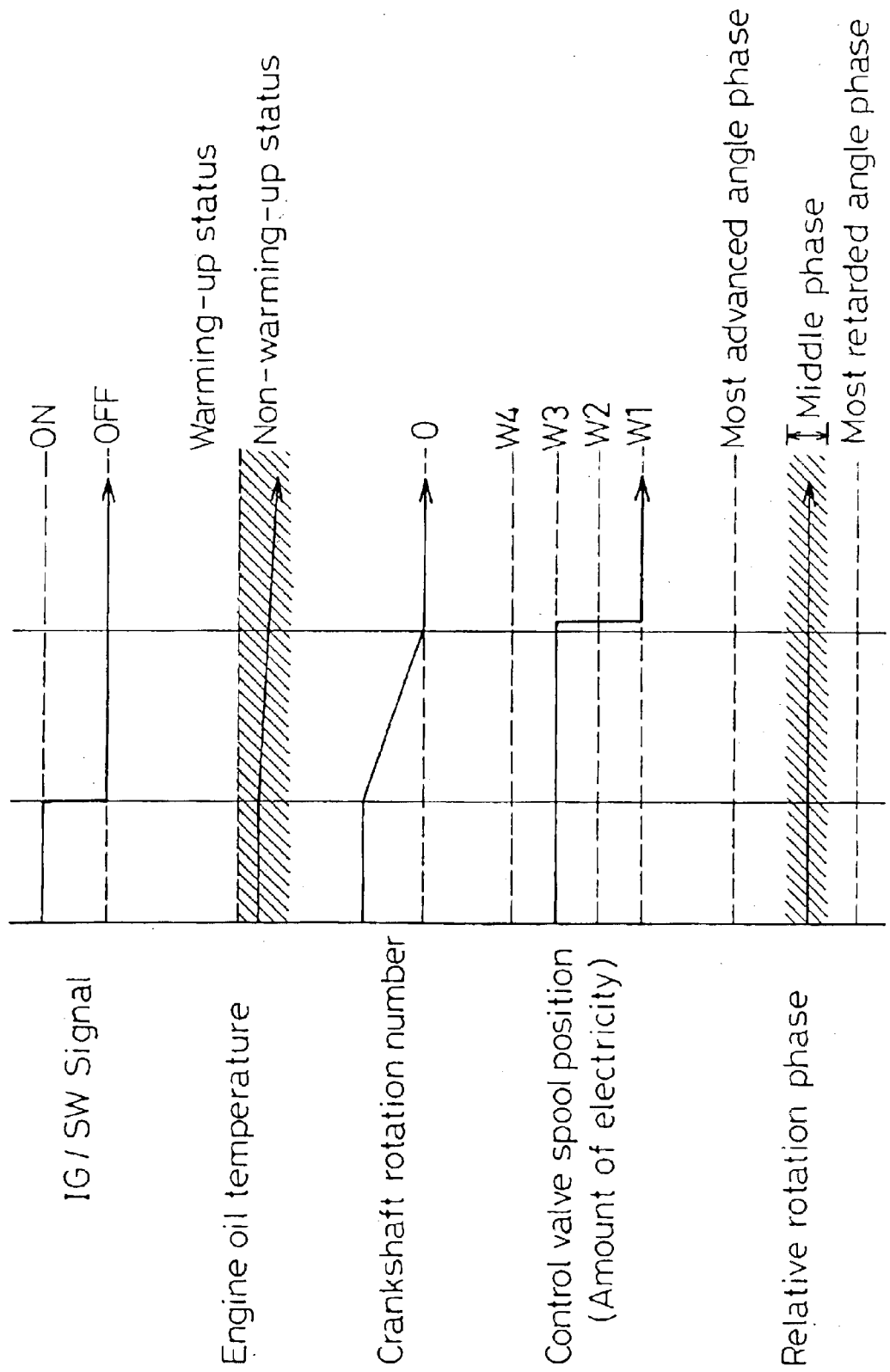
FIG. 9 is a timing chart showing some kinds of status when the maintain operation is prosecuted at the normal stop process.

In other word, when the ECU 9 determines that the engine is not at warming-up condition at the step 101 the ECU 9 hold the relative rotational phase of both rotors 1,2 and prosecutes the drain operation at the aforesaid step 102 of the hold operation as shown in FIG. 9 until the rotation of the crankshaft stops at the hold operation of the aforesaid step 102. If the operation oil in the advanced angle chamber 43 or the retarded angle chamber 42 or the lock oil chamber 62 is not drained because of high viscosity at low temperature and the relative rotational phase of both rotors 1,2 can not be oscillated with enough width the relative rotational phase of both rotors 1,2 is oscillated at near the middle phase and can be passed exactly through the lock phase and is secured of the lock status by the lock mechanism 6.

When the ECU 9 determines that the engine is at warming-up condition at the aforesaid step 101 the ECU 9 prosecutes the step 103 and detects the relative rotational phase of both rotors 1,2 by the camshaft phase detected by the cam angle sensor 90a and the crankshaft phase detected by the crank angle sensor 90b and determines whether the relative rotational phase of both rotors 1,2 is the middle phase.

When the ECU 9 determines that the relative rotational phase of both rotors 1,2 is the most retarded angle phase or the most advanced angle phase which is not the middle phase the ECU 9 prosecutes the transfer operation at the after-mentioned step 104. When the ECU 9 determines that the relative rotational phase of both rotors 1,2 is the middle phase the drain operation of the aforesaid step 109 is prosecuted.

Figure 8:
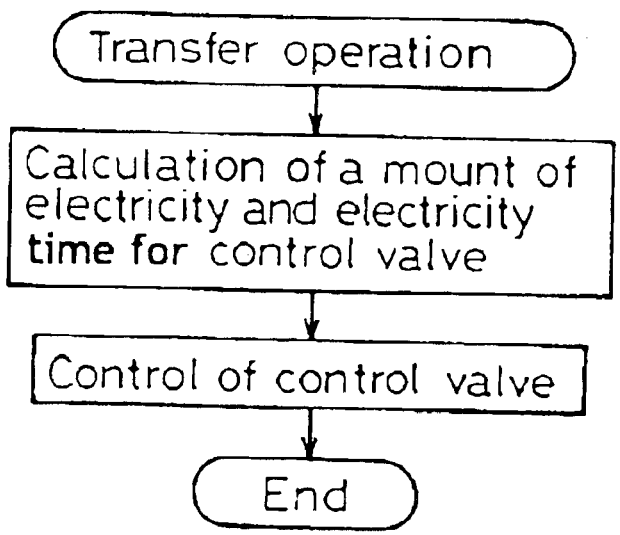
FIG. 8 is a flow chart showing the transfer operation of the valve timing control device shown in FIG. 6.

The transfer operation of the aforesaid step 104 as shown in FIG. 8 for transferring the relative rotational phase of both rotors 1,2 to the middle phase firstly calculates the mount of the electricity for the control valve 76 and the electricity time to maintain the mount of the electricity as a control parameter of control valve 76 on the basis of the engine oil temperature detected by the oil temperature sensor 90c, the crankshaft rotation number detected by the rotation sensor 90d, the relative rotational phase of both rotors 1,2 detected by the cam angle sensor 90a and the crank angle sensor 90b, the temperature of the cooling water, the shift range of the automatic transmission and the engine operation parameter at the moment when the engine stop signal is inputted. Then the control valve 76 is controlled on the basis of the aforesaid calculated control parameter. The advanced angle moving operation or the retarded angle moving operation is prosecuted to set the position of the spool of the control valve 76 at the position W2 or the position W4.

In other word, the mount of the electricity for the control valve 76 and the electricity time to maintain the mount of the electricity to set the position of the spool of the control valve 76 at the position W2 or the position W4 in order to obtain the target adjusting volume of the relative rotational phase of both rotors 1,2 by realizing the target adjusting volume for moving the relative rotational phase of both rotors 1,2 to the middle phase at the engine stop is calculated at the step 104 of the transfer operation.

The relative rotational phase of both rotors 1,2 is transferred to the middle phase by turning on electricity for the control valve 76 in accordance with the calculated the mount of the electricity and the electricity time and prosecuting the advanced angle transfer operation or the retarded angle transfer operation by the control valve 76 during the specified electricity time even where the relative rotational phase of both rotors 1,2 is the most retarded angle phase or the most advanced angle phase at the moment when the engine stop signal is inputted. Then the aforesaid drain operation at the step 109 is prosecuted and relatively hot operation oil and lock oil is drained immediately and the aforesaid relative rotational phase of both rotors 1,2 oscillates at the middle phase and the operation oil in both the advanced angle chamber and the retarded angle chamber is drained and the engine stops.

Figure 10:
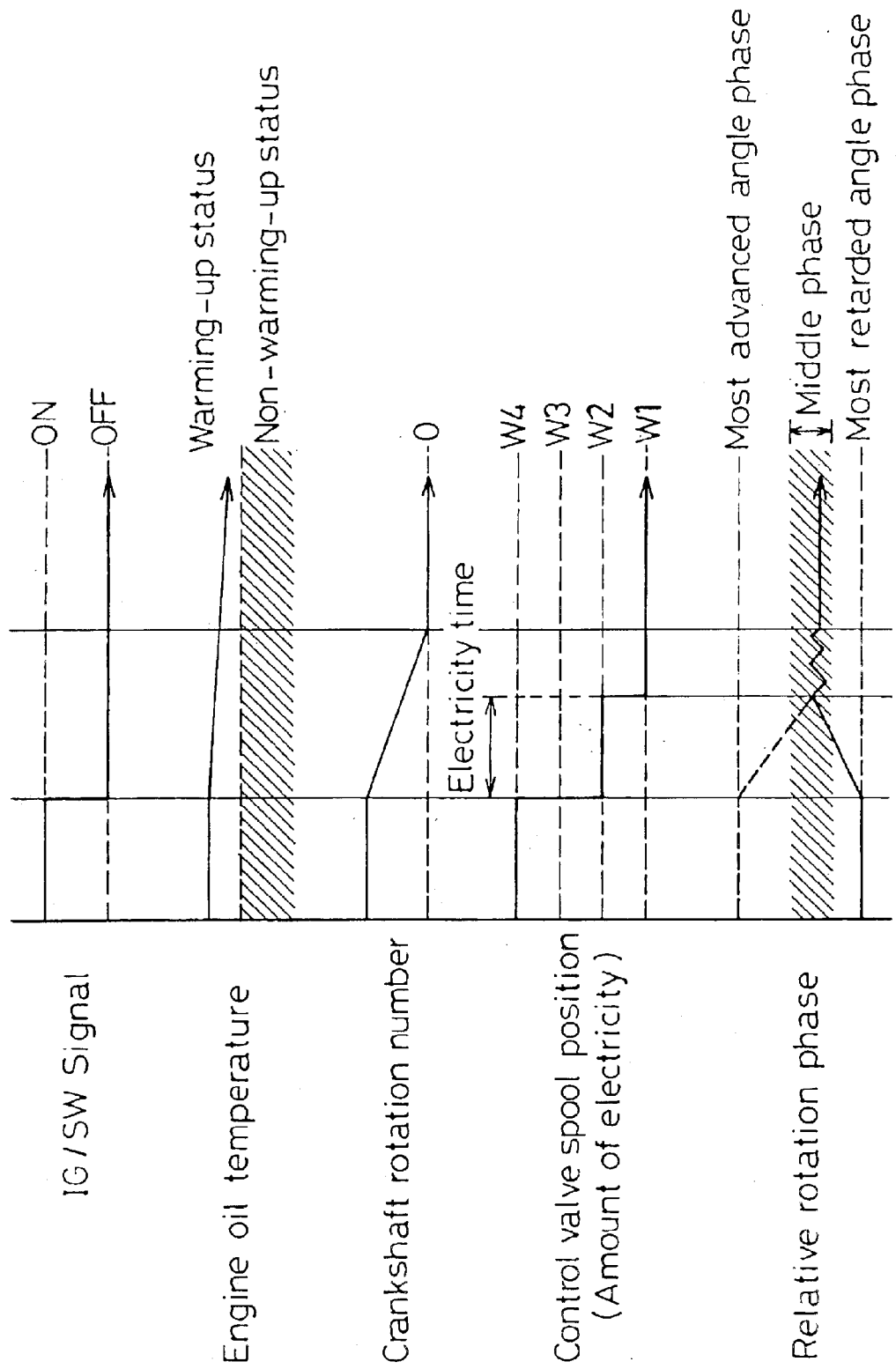
FIG. 10 is a timing chart showing some kinds of status when the transfer operation is prosecuted at the normal stop process.

Thus when the engine is determined to be at warming-up status at the step 101 and the relative rotational phase of both rotors 1,2 is determined not to be the middle phase the drain operation at the step 109 is prosecuted after the relative rotational phase of both rotors 1,2 is set at the middle phase as shown in FIG. 10. Because the operation oil in the advanced angle chamber 43 or the retarded angle chamber 42 or the lock oil in the lock oil chamber 62 is relatively high temperature and of low viscosity after the drain operation at engine stop or after cranking start of the crankshaft at the engine restart the relative rotational phase of both rotors 1,2 can be oscillated at the middle phase excellently and can be secured to be at the lock status by the lock mechanism 6 with passing through the lock phase exactly.

Figure 11:
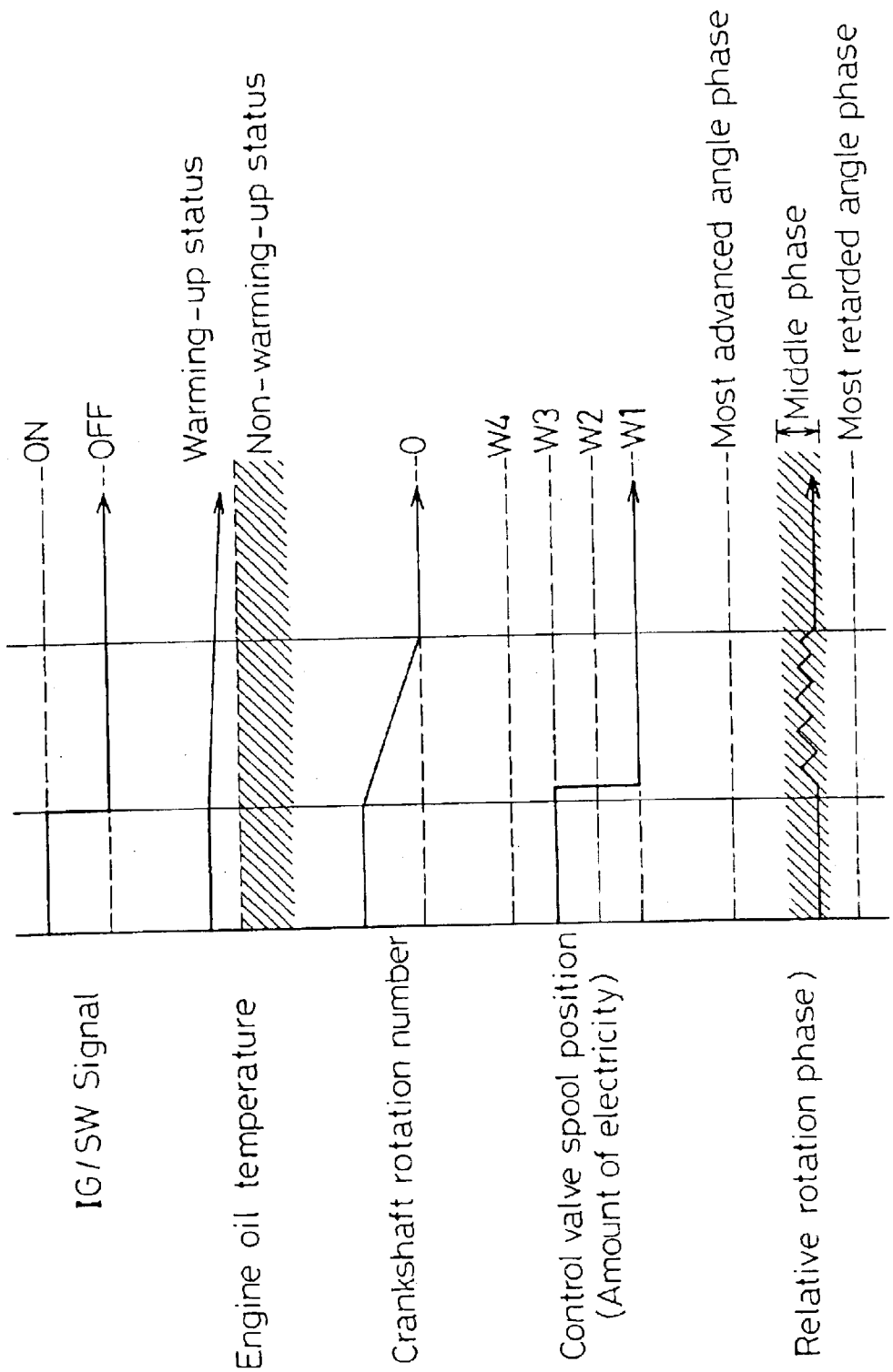
FIG. 11 is a timing chart showing some kinds of status when the maintain operation and the transfer operation are not prosecuted at the normal stop process.
Figure 12:
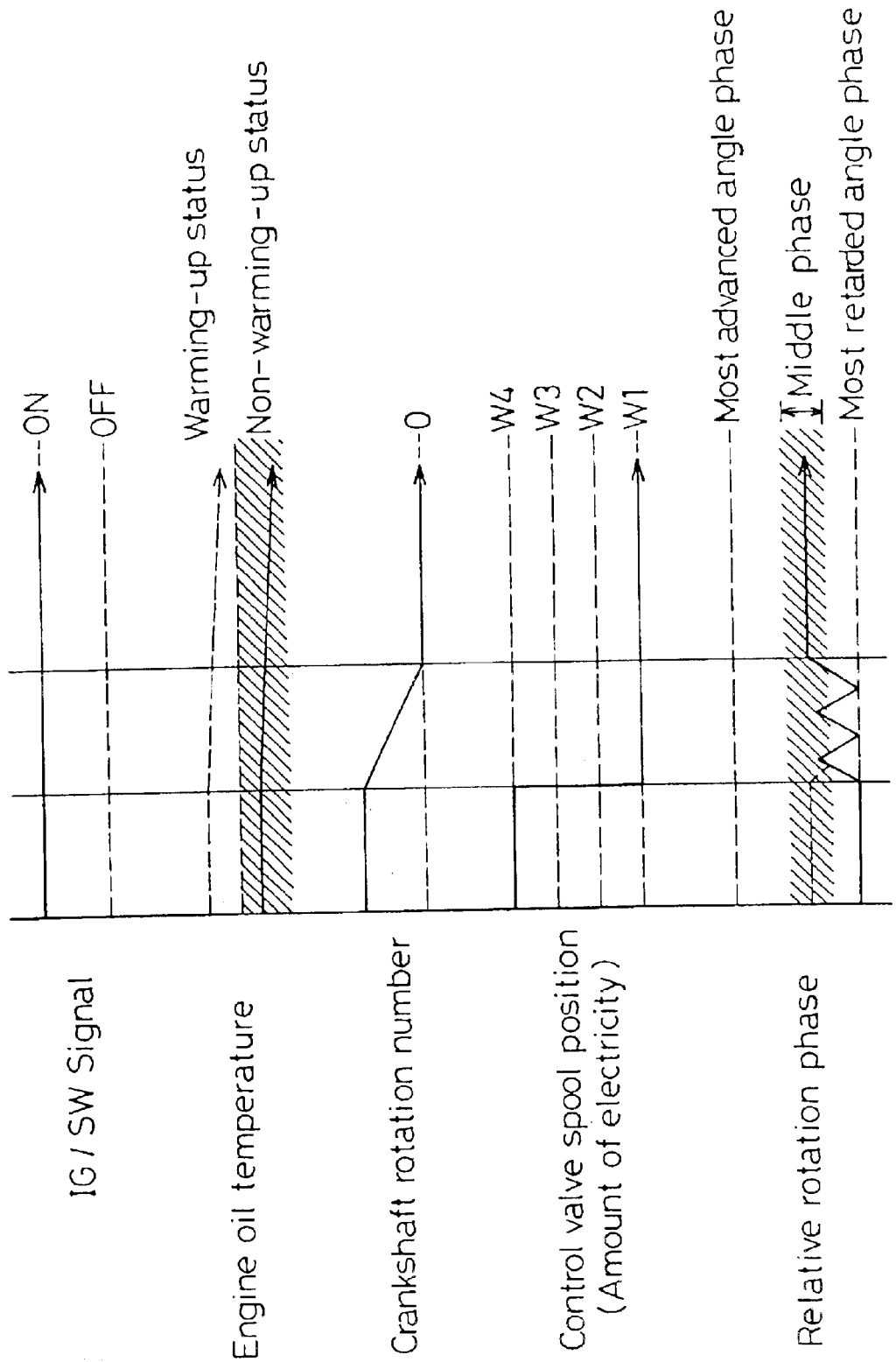
FIG. 12 is a timing chart showing some kinds of status when the maintain operation is not prosecuted at the abnormal stop process.

Meanwhile when the relative rotational phase of both rotors 1,2 is determined to be the middle phase the ECU 9 oscillates excellently and can secure the aforesaid relative rotational phase of both rotors 1,2 at the lock status by the lock mechanism 6 after the drain operation at engine stop or after cranking start of the crankshaft at the engine restart by prosecuting the drain operation of the aforesaid step 109 immediately as shown in FIG. 11 because the operation oil in the advanced angle chamber 43 or the retarded angle chamber 42 or the lock oil in the lock oil chamber 62 is relatively high temperature and of low viscosity.

Secondly, the mode in which the drain operation of the aforesaid step 109 is explained after the prosecution of the abnormal stop operation.

On the abnormal stop operation after the engine stop signal is determined not to be inputted from IG/SW 90e at aforesaid step 100 the ECU 9 prosecutes firstly the step 105 and determines if the engine tall is avoided by the inputting avoidance signal of the engine stall. In case the engine tall can be avoided the normal operation control is prosecuted and the engine running is maintained.

Meanwhile in case the engine stall is determined not to be avoided the step 106 is prosecuted it is determined if the relative rotational phase of both rotors 1,2 is near the lock phase as same as the aforesaid step 103. On the other hand, the step 107 is prosecuted and it is determined whether the engine at the warming-up status or not as same as the aforesaid step 101.

Meanwhile in case that the relative rotational phase of both rotors 1,2 is determined not to be the middle phase at aforesaid step 106 or in case that the engine is at the warming-up status but the relative rotational phase of both rotors 1,2 is determined to be at the middle phase at aforesaid step 106 the drain operation 108 of the aforesaid step 109 immediately.

Thus in case that the relative rotational phase of both rotors 1,2 is not at the middle phase or the engine is at the warming-up status the relative rotational phase of both rotors 1,2 can be oscillated efficiently and the operation oil in both the advanced angle chamber 43 and the retarded angle chamber 42 is drained excellently by prosecuting immediately the drain operation when the rotation of the crankshaft immediately after the engine stall and the engine can be stopped Therefore the relative rotational phase of both rotors 1,2 is oscillated efficiently and the lock status is secured by the lock mechanism 6 after the drain operation at the engine stop or after the cranking start of the crankshaft at the engine restart.

On the other hand in case that the relative rotational phase of both rotors 1,2 is determined to be the middle phase at the aforesaid step 106 and the engine is not at the warming-up status at the aforesaid step 106 the mount of the electricity for the control valve 76 is maintained to the mount of the electricity of the time and the hold operation to hold the relative rotational phase of both rotors 1,2 at the middle phase is prosecuted and the drain operation of the aforesaid step 109 is prosecuted after the hold operation of the aforesaid step 108.

Figure 13:
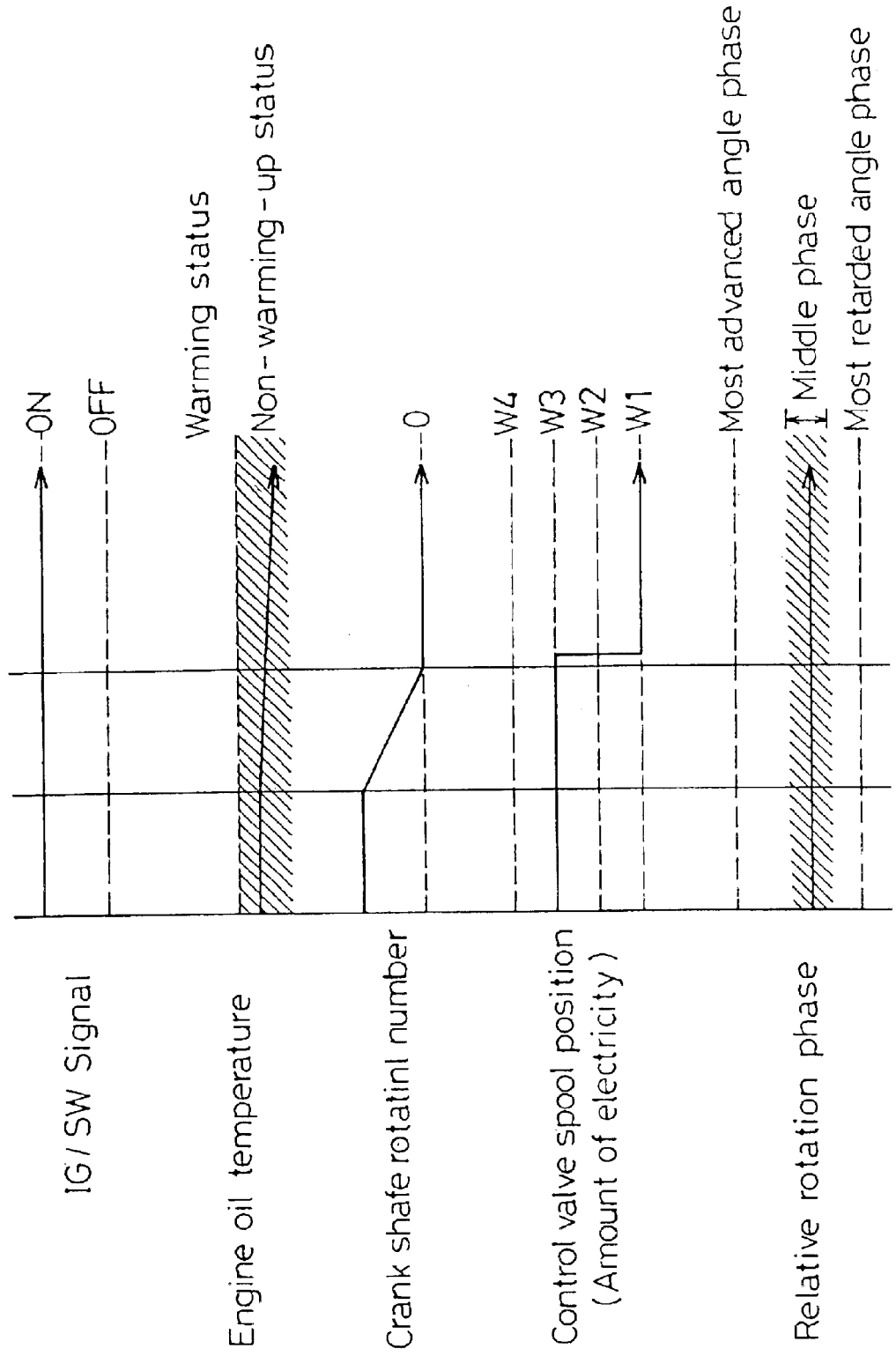
FIG. 13 is a timing chart showing some kinds of status when the maintain operation is prosecuted at the abnormal stop process.

In other word, when the ECU 9 determines that the engine is not at warming-up condition at the step 107 the ECU 9 hold the relative rotational phase of both rotors 1,2 and prosecutes the drain operation at the aforesaid step 109 of the hold operation as shown in FIG. 13 until the rotation of the crankshaft stops at the hold operation of the aforesaid step 108. If the operation oil in the advanced angle chamber 43 or the retarded angle chamber 42 or the lock oil chamber 62 is not drained because of high viscosity at low temperature and the relative rotational phase of both rotors 1,2 can not be oscillated with enough width the relative rotational phase of both rotors 1,2 is oscillated near middle phase and can be passed exactly through the lock phase and is secured of the lock status by the lock mechanism 6.

Although in this embodiment of the invention the control valve consists of single valve, it is permitted that the control valve consists of plural hydraulic control valve not only apply to the single valve. For example, it is permitted that the control valve comprises the control valve which supply/drain the operation oil to/from the retarded angle chamber 42 and the control valve which supply/drain the operation oil to/from the advanced angle chamber 43 and the control valve which supply/drain the operation oil to/from the lock oil chamber 62.

Although in the aforesaid embodiment of the invention whether the engine is at the warming-up status or not is determined by determining whether the engine oil temperature reaches the predetermined temperature. It is permitted that whether the engine is at the warming-up status or not is determined by determining whether the engine cooling-water temperature reaches the predetermined temperature as other way.

It is permitted that the various components of the valve timing control device afore-explained can be replaced with the unitary body combined the vane 5 and the inner rotor 1 or another component of the lock mechanism 6 and etc unless the embodiment is out of the subject-matter of the invention

What we claim is:

1. A variable valve timing control device comprising:
   a drive member rotatable in synchronization with a crankshaft;
   a rotatable driven member connected to a camshaft arranged co-axially with the drive member;
   a hydraulic chamber formed at one of the drive member and the driven member;
   a vane dividing the hydraulic chamber into an advanced angle chamber and a retarded angle chamber;
   a relative rotation phase controlling mechanism which controls a relative rotation phase between the drive member and the driven member between a most retarded angle chase in which a volume of the advanced angle chamber is a maximum and a most advanced angle phase in which a volume of the retarded angle chamber is a maximum by supplying or discharging operation fluid to and/or from the advanced angle chamber and the retarded angle chamber;
   a lock mechanism which restricts relative rotation between the drive member and the driven member, when the relative rotation phase is a predetermined lock phase between the most advanced angle phase and the most retarded angle phase;
   a control mechanism performing an intermediate phase operation upon input of a signal indicating engine stop to position the relative rotation chase intermediate between the most advanced angle phase and the most retarded angle phase by operating the relative rotation phase controlling mechanism, and performing a drain operation to drain the operation fluid from both the advanced angle chamber and the retarded angle chamber after performing the intermediate phase operation; and wherein upon performing the intermediate phase operation, in the case that the relative rotation phase is positioned in the intermediate phase, upon input of a signal indicating engine stop, a maintaining operation to maintain the relative rotation phase is accomplished and in the case that the relative rotation phase is not positioned in the intermediate phase, upon input of a signal indicating engine stop, a transfer operation to transfer the relative rotation phase to the intermediate phase is accomplished.

2. A variable valve timing control device as set forth in claim 1, wherein upon performing the maintain operation, in the case that the engine is not warm the relative rotation phase is maintained until a rotation of the crankshaft is stopped.

3. A variable valve timing control device as set forth in claim 1, wherein upon performing the transfer operation, the relative rotation phase control mechanism is operated on the basis of a running parameter of the engine upon input of a signal indicating engine stop and the relative rotation phase is transferred to the intermediate phase.

4. A variable valve timing control device as set forth in claim 2, wherein upon performing the transfer operation, the relative rotation phase control mechanism is operated on the basis of a running parameter of the engine upon input of a signal indicating engine stop and the relative rotation phase is transferred to the intermediate phase.

5. A variable valve timing control device as set forth in claim 3, wherein upon performing the transfer operation, a control parameter of the relative rotation phase control mechanism relative to a target control amount is determined on the basis of the running parameter of the engine upon input of a signal indicating engine stop.

6. A variable valve timing control device as set forth in claim 4, wherein upon performing the transfer operation, a control parameter of the relative rotation phase control mechanism relative to a target control amount is determined on the basis of the running parameter of the engine upon input of a signal indicating engine stop.

* * * * *